Patented Feb. 17, 1925.

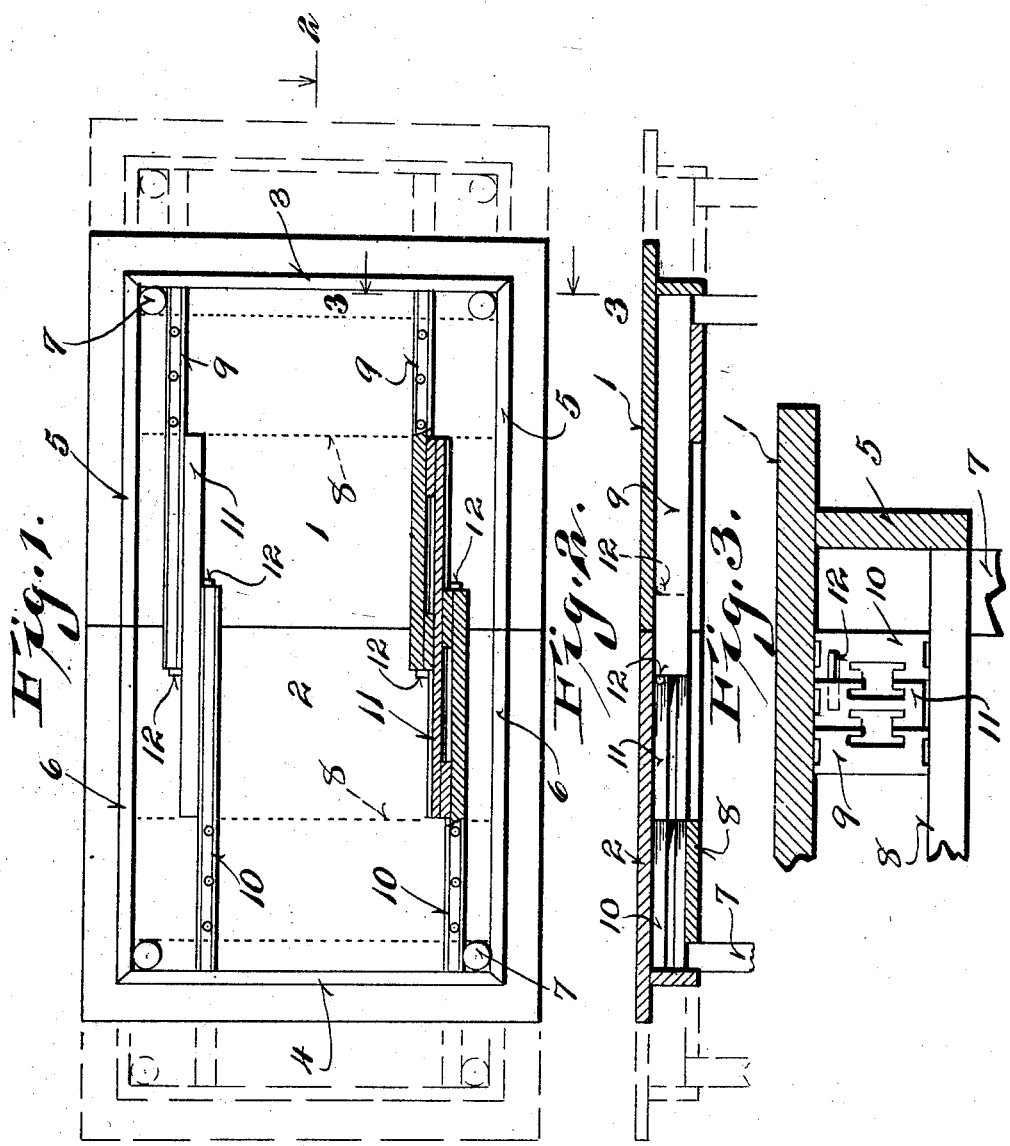

1,526,808

UNITED STATES PATENT OFFICE.

HARRY N. SMITH, OF WATERTOWN, WISCONSIN, ASSIGNOR TO WATERTOWN TABLE-SLIDE CO., OF WATERTOWN, WISCONSIN.

TABLE SLIDE.

Application filed January 8, 1924. Serial No. 684,954.

*To all whom it may concern:*

Be it known that I, HARRY N. SMITH, a citizen of the United States, and resident of Watertown, in the county of Jefferson and State of Wisconsin, have invented certain new and useful Improvements in Table Slides; and I do hereby declare that the following is a full, clear, and exact description thereof.

This invention relates to extensible tables, and is directed to table slides.

Objects of this invention are to provide a table which is so constructed that an economy may be effected in the table slides and a materal saving in the amount of material secured, in which the table is fully and completely braced from one rim across to the other rim at all times, and in which these desirable results are secured with a minimum of elements.

An embodiment of the invention is shown in the accompanying drawings, in which:—

Figure 1 is a bottom plan view of a table equipped with the slides with the bridging members omitted and with certain portions of the slides in section.

Figure 2 is a longitudinal sectional view on the line 2—2 of Figure 1.

Figure 3 is a sectional view to an enlarged scale on the line 3—3 of Figure 1.

The table comprises a top composed of two half sections 1 and 2 which are equipped with end rims 3 and 4 and with side rims 5 and 6. The corner legs 7 are mounted inwardly of the corner portions of these rims, as shown, and a bridging piece 8 is positioned between the side rims adjacent the end portions.

The slides comprise end slides 9 and 10 and an intermediate slide 11. The end slides 9 are extended into abutting relation with the rim 3 and the end slides 10 are extended into abutting relation with the rim 4. The intermediate slide 11 is provided with steel dowel pins 12 against which the inner ends of the slides 9 and 10 abut when the table is completely closed, as shown in Figure 1.

By this construction, it is possible to materially shorten the slides for the reason that the center slide 11 in each of the sets of slides illustrated does not project to the outer ends of the table and consequently a great saving in material is secured. Further than this, the outer slides 9 and 10 may be shortened up as they are not called upon to extend the full length of the central slide 11 when the table is closed or contracted to its smaller size.

It is to be noted that the provision of the dowel pins 12 insures the direct relative positioning of the center slide 11 when the table is in closed position, although such center slide does not contact with the rims 3 and 4 of the table.

It will be further noted that the table is supported from one rim completely across to the other rim in all positions of adjustment and consequently a very sturdy and solid table construction is secured.

Although the invention has been described in considerable detail, it is to be understood that the invention may be variously embodied and is, therefore, to be limited only as claimed.

I claim:

An extensible table comprising a pair of top sections having outer rims secured to their under side, legs supporting said sections, and a plurality of slide units each unit comprising a center slide and a pair of outer slide members secured to the respective sections and adapted to project from opposite ends of said center slide when the table is fully contracted, said center slide having stops positioned upon opposite sides thereof and spaced from the respective ends of such slide member and adapted to contact with the corresponding outer slide members, said stops being set in from the respective ends of the center slide a distance equal to the amount of projection of the outer slide members.

In testimony that I claim the foregoing I have hereunto set my hand at Watertown, in the county of Jefferson and State of Wisconsin.

HARRY N. SMITH.